March 15, 1966   A. KÜNZLI   3,240,677
NUCLEAR REACTOR HAVING PRESSURE TUBES
Filed June 6, 1963   2 Sheets-Sheet 1

*Inventor:*
ALBERT KÜNZLI
By K. A. ...
ATTORNEY.

*Inventor:*
ALBERT KÜNZLI
By K.A. Mayr
ATTORNEY.

United States Patent Office 3,240,677
Patented Mar. 15, 1966

3,240,677
NUCLEAR REACTOR HAVING PRESSURE TUBES
Albert Künzli, Winterthur, Switzerland, assignor to Sulzer Brothers Limited, Winterthur, Switzerland, a corporation of Switzerland
Filed June 6, 1963, Ser. No. 285,965
Claims priority, application Switzerland, June 13, 1962, 7,125/62
3 Claims. (Cl. 176—50)

The invention relates to a nuclear reactor having pressure tubes containing fuel rods and conducting a coolant.

In conventional nuclear reactors of the aforesaid type the entire space between the fuel rods and the inside of the pressure tube is filled with coolant flowing through the tube and the entire moderator material is placed outside of the pressure tubes. In the conventional arrangements there is no uniform flow of coolant around the fuel rods. It has been proposed to place a bundle of fuel rods in a tube made of graphite to reduce the effect of heat emanating from the fuel rods on the pressure tube. In this arrangement there is also a very poor circulation of the coolant around the fuel rods.

It is an object of the invention to provide a pressure tube and fuel rod arrangement effecting a uniform flow of coolant around the fuel rods and providing protection of the pressure tube from excessive heat as well as utilization of the space within the pressure tube which space is not occupied by the fuel rods, for moderation. These objects are obtained by placing shapes made of moderating material inside the pressure tube and between the fuel rods, the shapes being provided with channels or bores conducting the coolant and accommodating fuel rods.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

Figure 1:
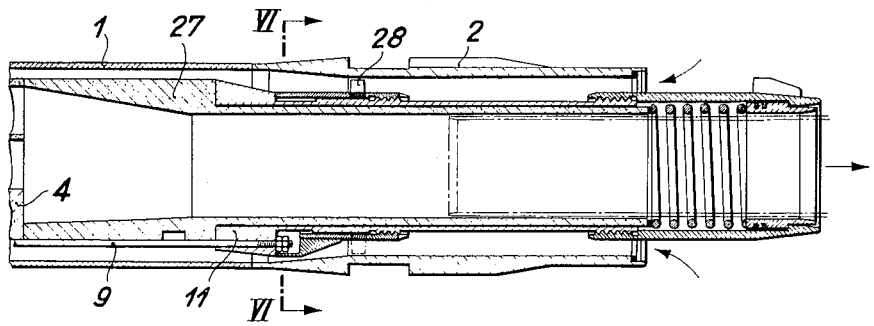
FIG. 1 is a longitudinal section of one end of a pressure tube, moderating material and fuel rod assembly according to the invention.
Figure 2:
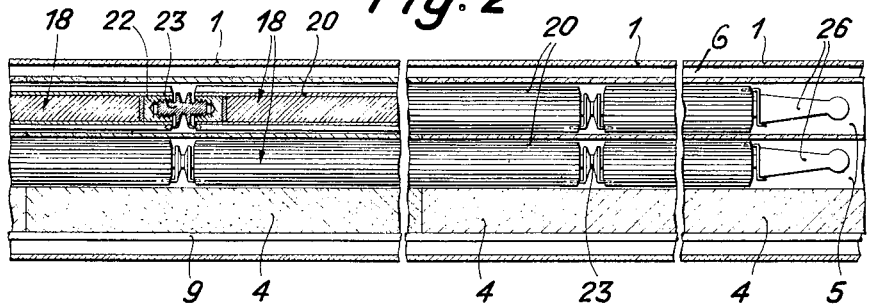
FIG. 2 is a longitudinal sectional view of an intermediate portion of the assembly of which one end is illustrated in FIG. 1.
Figure 3:
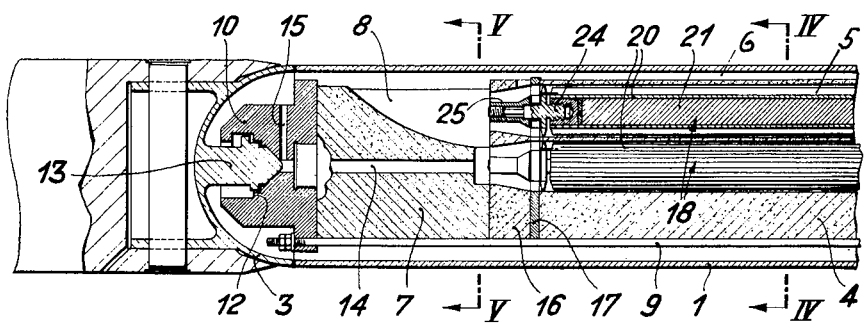
FIG. 3 is a longitudinal sectional view of the end of the assembly which end is opposite to that shown in FIG. 1.

Referring more particularly to FIGURES 1 to 3 of the drawing, numeral 1 designates a pressure tube whose right end, shown in FIG. 1, is provided with a bayonet joint 2 for mounting the tube in the reactor and connecting a coolant conduit in the reactor. The coolant flow is reversed at the left end of the pressure tube which is shown in FIG. 3. For this purpose the left end of the tube 1 is provided with a hemispherical closure 3. Bodies or shapes 4 made of moderating material, for example graphite, are placed in the pressure tube 1, each shape having a plurality of bores or channels 5. There is a space 6 between the outside of the shapes and the inside of the tube through which space flows the incoming relatively cool coolant. At the flow reversal end of the tube a special shape or connecting element 7 is provided which is made of moderating material and is provided with channels 8 connecting the space 6 for coolant flow with the channels 5. At the right end of the assembly (FIG. 1) a special hollow shape or element 27, made of moderating material, is placed adjacent to and coaxial of the rightmost shape 4. The inlet of the element 27 is conical and continues into a tube. A metallic end piece 11 surrounds the element 27 and abuts against an outside shoulder thereof. At the left end of the assembly (FIG. 3) a metallic end piece 10 forming one part of a bayonet joint 12 cooperates with a suitably shaped protuberance 13 axially projecting from the inside of the hemispherical closure 3 of the tube 1. The members 10, 7, 4, 27 and 11 are axially compressed by tie rods 9 placed parallel to the longitudinal axis of the tube 1.

The members 7 and 10 are provided with channels 14 and 15, respectively, conducting coolant and being additionally cooled thereby. A connecting element 16 made of moderating material and a metallic fastening plate 17 are interposed between the members 4 and 7. The element 16 and the plate 17 are provided with apertures 19 (FIG. 8) which are coaxial of the channels 5.

Figure 4:
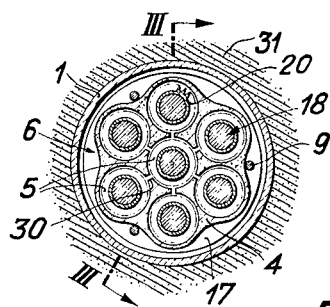
FIG. 4 is a cross-sectional view of the assembly shown in FIGS. 1 to 3, the section being made along line IV—IV of FIG. 3.
Figure 5:
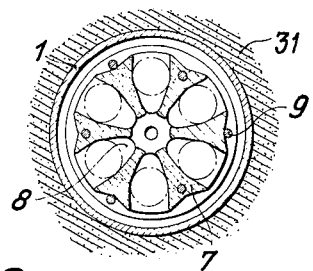
FIG. 5 is a cross-sectional view of the assembly, the section being made along line V—V of FIG. 3.

Fuel rods 18 are placed in the channels 5 of the shapes 4. The fuel rods consist of fissionable material 21 contained in claddings 20. The latter are preferably provided with longitudinal ribs, as shown in FIG. 4. The ends of the fuel rods 18 are provided with internally threaded elements 22 (FIG. 2) into which externally threaded connectors 23 are screwed for connecting a plurality of relatively short fuel rods in aligned relation to form a relatively long fuel rod.

Figure 6:
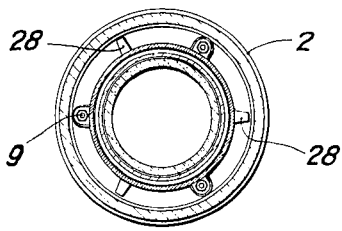
FIG. 6 is a cross-sectional view of the assembly, the section being made along line VI—VI of FIG. 1.
Figure 8:
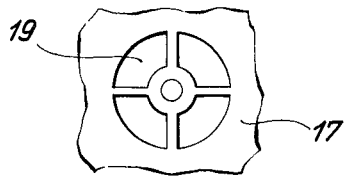
FIG. 8 shows a detail of the assembly portion shown in FIG. 3.

The left ends of the fuel rods (FIG. 3) are provided with connectors 24 screwed into nutlike portions 25 formed in the apertures 19 of the plate 17 as shown in FIG. 8. The connectors 24 anchor the left ends of the fuel rods whereas the right ends of the fuel rods can move freely upon expansion and contraction of the fuel rods. The right ends of the fuel rods are provided with means 26 adapted to be grapped by a suitable tool. A ring having radial protuberances 28 (FIGS. 1 and 6) is made fast on the metallic end piece 11 for laterally supporting and centering the assembly of fuel rods and shapes made of moderating material in the tube 1. There is a clearance between the ends of the protuberances 28 and the inside of the element 2, permitting longitudinal and lateral expansion of the assembly. The protuberances 28 are preferably made of graphite to avoid seizing.

The coolant enters the space between the inside of the element 2 and the outside of the element 11 as shown by arrows in FIG. 1 and flows in the space between the inside of the tube 1 and the shapes 27 and 4 toward the left end of the tube 1. Here, the direction of flow is reversed, the coolant flowing through channels 8 into channels 5 of the shapes 4. A portion of the coolant flows through the bores 15 and 14 into the central bore 5. The coolant flows within the bores or channels 5 along the fuel rods 18 and absorbs the heat generated therein. The heated coolant leaving the last of the channels 5 enters the element 27 which forms the outlet of the pressure tube and fuel rod assembly and conducts the heated coolant into the piping of the reactor, the inlet to this piping being indicated by dash-dot lines in FIG. 1.

The shapes 7, 16, 4 and 27, particularly the elements or shapes 4, cause a uniform flow of the coolant along the fuel rods 18. As seen in FIG. 4, there is only a small clearance between the inside of the channels 5 and the edges of the ribs of the claddings of the fuel elements. In the illustrated example the fuel elements are cylindrical and the channels 5 are also cylindrical. There are no spaces wherein a short circuit current of the coolant may occur and wherein the coolant is not in intimate contact with the fuel rods. The shapes 4 shield the inside of the pressure tube 1 against excessive heating by the fuel rods. This shielding effect is assisted by the flow of the fresh and relatively cool coolant through the space 6 between the shapes and the inside of the pressure tube 1 which is effectively cooled by the arrangement according to the invention. The shapes 4 and elements 7, 16 and 27 are not objectionable, as would be metallic elements but, since they are made of moderating material, assist a moderator 31 surrounding the pressure tubes 1 in the conventional manner. In the arrangement according to the invention there is only an absolute minimum of the metallic parts inside the pressure tubes.

Figure 7:
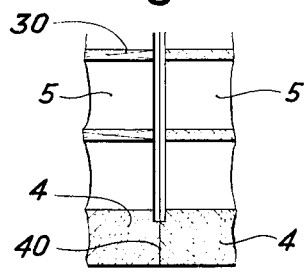
FIG. 7 is a large scale longitudinal sectional view of the adjoining ends of two elements made of moderating material and forming part of the assembly according to the invention.

As seen in FIG. 7, only the outside portion 40 of the end surfaces of two adjacent shapes 4 facing one another are made to abut each other. The inside portion of the adjoining surfaces are slightly spaced to take care of the relatively great heat expansion of the central portions of the shapes. The shapes 4 are preferably provided with slots 30 (FIG. 4) placed longitudinally of the channels 5 and connecting the central channel with the peripheral channels.

I claim:
1. A nuclear reactor comprising:
   a plurality of pressure tubes,
   a moderator surrounding said pressure tubes,
   a plurality of oblong shaped means made of moderating material and placed in axially aligned position in each of said tubes,
   each of said shaped means being provided with a plurality of channels,
   said channels of axially aligned shaped means being aligned to form continuous channels longitudinally of said tubes,
   a fuel rod in each of said continuous channels,
   a coolant flowing through said channels, and
   a plurality of tie rods placed inside each pressure tube and operatively connected to and pressing said shaped means against each other in the direction of alignment of said shaped means.

2. A nuclear reactor comprising:
   a plurality of pressure tubes,
   a moderator surrounding said pressure tubes,
   a plurality of oblong shaped means made of moderating material and placed in axially aligned position in each of said tubes,
   each of said shaped means being provided with a plurality of channels,
   said channels of axially aligned shaped means being aligned to form continuous channels longitudinally of said tubes,
   a fuel rod in each of said continuous channels,
   said shaped means having surfaces facing the inside of said pressure tubes and being spaced therefrom to form conduits longitudinally of the tubes,
   a coolant flowing through said channels and through said conduits,
   coolant conducting means placed inside and adjacent to one end of each of said tubes,
   each of said conducting means including an element having channels for connecting said conduits in the respective tube to the continuous channels of the shaped means of said respective tube for conducting the coolant from said conduits into said continuous channels,
   a metallic plate placed in each tube normal to the longitudinal axis of the tube and between said element and the neighboring shaped means and including means for connecting one of the ends of the fuel rods to said plate for fixing the position of said ends of the fuel rods, and
   tie rods placed inside and longitudinally of said tubes for compressing said coolant and conducting means, said element, said metallic plate, and said shaped means in the longitudinal direction of the respective tube.

3. A nuclear reactor as defined in claim 2 wherein said shaped means, said metallic plate, said element, said coolant conducting means, said fuel rods and said tie rods in each tube form a unit, said coolant conducting means and the ends of said tubes adjacent to which said conducting means is placed including a bayonet joint for connecting said unit to the respective tube.

References Cited by the Examiner

UNITED STATES PATENTS

| 2,832,732 | 4/1958 | Wigner | 176—50 |
|---|---|---|---|
| 3,033,773 | 5/1962 | Schluderberg et al. | 176—59 |
| 3,053,746 | 9/1962 | Challender et al. | 176—27 |
| 3,071,527 | 1/1963 | Young | 176—52 |
| 3,075,910 | 1/1963 | Taylor | 176—30 |
| 3,085,964 | 4/1963 | Ritz et al. | 176—61 |
| 3,089,840 | 5/1963 | Carter et al. | 60—36 |

FOREIGN PATENTS

| 1,228,941 | 3/1960 | France. |
|---|---|---|
| 1,298,461 | 6/1962 | France. |
| 838,838 | 6/1960 | Great Britain. |

OTHER REFERENCES

Principles of Nuclear Reactor Engineering, Glasstone, 1955, pp. 744–746. TK9202,G55.

CARL D. QUARFORTH, *Primary Examiner.*